United States Patent
Zhang et al.

(10) Patent No.: US 10,056,754 B2
(45) Date of Patent: *Aug. 21, 2018

(54) SYSTEMS AND METHODS FOR MANAGING A VOLTAGE REGULATOR

(71) Applicant: Dell Products L.P., Round Rock, TX (US)

(72) Inventors: Kejiu Zhang, Round Rock, TX (US); Shiguo Luo, Austin, TX (US); Hang Li, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 254 days.

This patent is subject to a terminal disclaimer.

(21) Appl. No.: 15/054,814

(22) Filed: Feb. 26, 2016

(65) Prior Publication Data

US 2016/0204604 A1 Jul. 14, 2016

Related U.S. Application Data

(63) Continuation of application No. 14/059,650, filed on Oct. 22, 2013, now Pat. No. 9,306,456.

(51) Int. Cl.
*G06F 1/28* (2006.01)
*H02J 1/00* (2006.01)
*H02M 3/158* (2006.01)
*H02M 1/38* (2007.01)

(52) U.S. Cl.
CPC ............. *H02J 1/00* (2013.01); *G06F 1/28* (2013.01); *H02M 1/38* (2013.01); *H02M 3/158* (2013.01); *H02M 3/1584* (2013.01)

(58) Field of Classification Search
None
See application file for complete search history.

(56) References Cited

U.S. PATENT DOCUMENTS

| | | |
|---|---|---|
| 7,825,642 B1 | 11/2010 | Young et al. |
| 7,999,520 B2 | 8/2011 | Luo et al. |
| 8,219,832 B2 | 7/2012 | Breen, III et al. |
| 2006/0091871 A1 | 5/2006 | Abedinpour et al. |
| 2006/0152204 A1 | 7/2006 | Maksimovic et al. |
| 2007/0126409 A1 | 6/2007 | Cannella et al. |
| 2007/0139973 A1 | 6/2007 | Leung |
| 2012/0032657 A1 | 2/2012 | Dequina |

*Primary Examiner* — Robert Cassity
*Assistant Examiner* — Gary Collins
(74) *Attorney, Agent, or Firm* — Jackson Walker L.L.P.

(57) ABSTRACT

A voltage regulator may comprise a high-side switch and a low-side switch for delivering electrical current to the at least one information handling resource, a high-side driver configured to drive a high-side driving voltage for regulating a first electrical current of the high-side switch, a low-side driver configured to drive a low-side driving voltage for regulating a second electrical current of the low-side switch, and a control circuit configured to operate the at least one voltage regulator in both of a fixed dead time mode and an adaptive dead time mode.

15 Claims, 3 Drawing Sheets

SYSTEMS AND METHODS FOR MANAGING A VOLTAGE REGULATOR

The present patent application is a continuation of a previously filed patent application, U.S. patent application Ser. No. 14/059,650, filed Oct. 22, 2013, the entirety of which is hereby incorporated by reference.

TECHNICAL FIELD

The present disclosure relates in general to information handling systems, and more particularly to managing a voltage regulator in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a voltage regulator to provide a constant voltage level and a current to power the system. For example, a voltage regulator may receive an input voltage and produce an output current at a predetermined output voltage required by a load, i.e., the circuit element(s) for which it is providing power. Moreover, modern information handling systems may include components that maintain current requirements across a broad range from relatively high peak currents to very low stable currents. More particularly, voltage regulators may be required to maintain a high efficiency, or low power loss, over such ranges. In particular, a direct current to direct current (DC-DC) voltage regulator may include a controller, one or more drivers, and one or more power stages. Furthermore, a power stage may include one or more metal-oxide-semiconductor-field-effect-transistors (MOSFETs), which may be driven by the drivers.

Additionally, some voltage regulators may be capable of operating in multiple phases. To this end, the concept of a phase for a voltage regulator may typically refer to combining a driver and a power stage to form one phase. Thus, a multi-phase voltage regulator may include multiple instances of such combinations. Alternatively, a multi-phase voltage regulator may be thought as a combination of single phase voltage regulators. For example, a multi-phase voltage regulator may include a plurality of single phase voltage regulators coupled in parallel to provide varying ranges of output current. During periods of high loads, the multi-phase voltage regulator may function with all phases in operation. In contrast, for lower loads, it may employ phase-shedding and operate with a reduced number of phases.

Still, certain inefficiencies may arise due to the driver circuit designs of voltage regulators. For instance, the duration of dead time, which may refer to a time of inactivity between turning one MOSFET on and another off, between high-side and low-side MOSFETs may have an impact on efficiency. For example, using fixed dead time approaches, in which control circuit enforces a dead time of shortest possible fixed duration after a switching event are often efficient in normal steady-state operation of a voltage regulator, but may cause shoot through current when switching after a voltage regulator phase has been re-enabled following being disabled due to phase shedding. As another example, using adaptive dead time approaches (such as that set forth in U.S. Pat. No. 8,219,832, assigned to the same assignee as the present application, and incorporated by reference herein) may introduce unnecessarily long delays when a voltage regulator is operating in steady state, due to complex adaptive control logic and varying parasitic parameters of power state circuitry.

SUMMARY

In accordance with the teachings of the present disclosure, the disadvantages and problems associated with power dissipation in a voltage regulator have been reduced or eliminated.

In accordance with embodiments of the present disclosure, an information handling system may include at least one information handling resource and at least one voltage regulator coupled to the at least one information handling resource. The voltage regulator may comprise a high-side switch and a low-side switch for delivering electrical current to the at least one information handling resource, a high-side driver configured to drive a high-side driving voltage for regulating a first electrical current of the high-side switch, a low-side driver configured to drive a low-side driving voltage for regulating a second electrical current of the low-side switch, and a control circuit configured to operate the at least one voltage regulator in both of a fixed dead time mode and an adaptive dead time mode. In the fixed dead time mode, the control circuit delays by a fixed amount a propagation of a transition of a pulse-width modulated input signal to at least one of the high-side driver and the low-side driver. In the adaptive dead time mode, the control circuit transitions one of the high-side driving voltage and the low-side driving voltage in response to a determination that the other of the high-side driving voltage and the low-side driving voltage has decreased below a predetermined threshold voltage.

In accordance with these and other embodiments of the present disclosure, a method may include selecting a mode of operation of a voltage regulator from a fixed dead time mode and an adaptive dead time mode. The method may also include in the fixed dead time mode, delaying by a fixed amount a propagation of a transition of a pulse-width modulated input signal to at least one of a high-side driver and a low-side driver of the voltage regulator, wherein the high-side driver is configured to drive a high-side driving voltage for regulating a first electrical current delivered by a high-side switch to a load and the low-side driver is configured to drive a low-side driving voltage for regulating a second electrical current delivered by a low-side switch to the load. The method may further comprise in the adaptive dead time mode, transitioning one of the high-side driving voltage and the low-side driving voltage in response to a determination that the other of the high-side driving voltage and the low-side driving voltage has decreased below a predetermined threshold voltage.

In accordance with these and other embodiments of the present disclosure, a voltage regulator may comprise a high-side switch and a low-side switch for delivering electrical current to the at least one information handling resource, a high-side driver configured to drive a high-side driving voltage for regulating a first electrical current of the high-side switch, a low-side driver configured to drive a low-side driving voltage for regulating a second electrical current of the low-side switch, and a control circuit configured to operate the at least one voltage regulator in both of a fixed dead time mode and an adaptive dead time mode. In the fixed dead time mode, the control circuit delays by a fixed amount a propagation of a transition of a pulse-width modulated input signal to at least one of the high-side driver and the low-side driver. In the adaptive dead time mode, the control circuit transitions one of the high-side driving voltage and the low-side driving voltage in response to a determination that the other of the high-side driving voltage and the low-side driving voltage has decreased below a predetermined threshold voltage.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
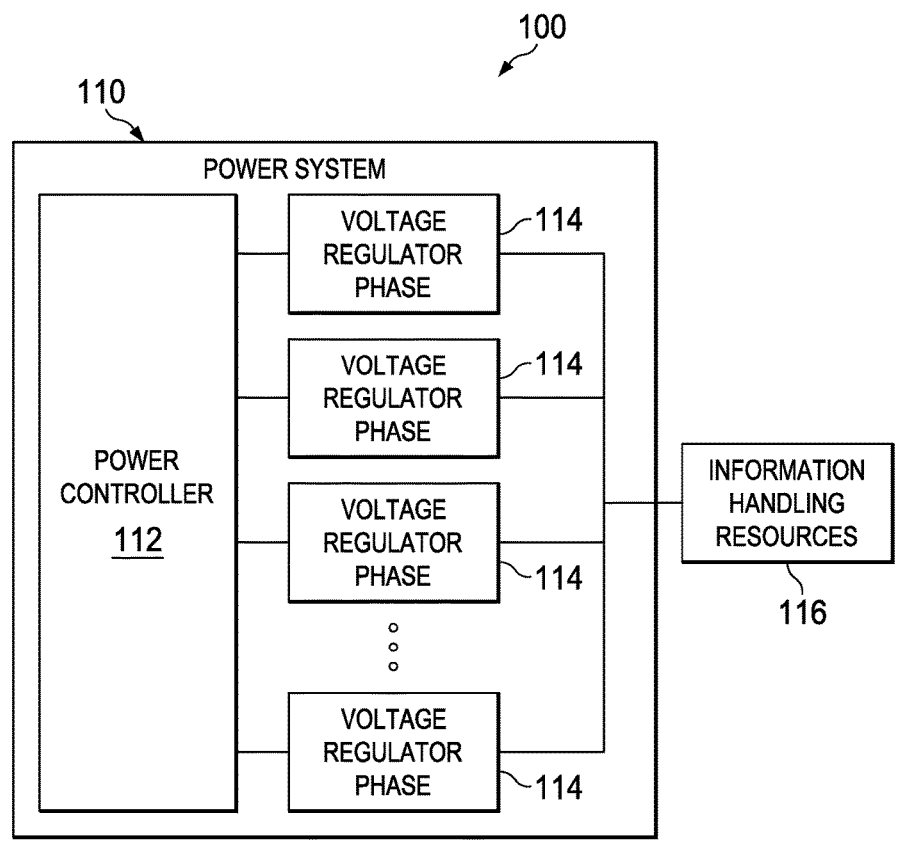
FIG. 1 illustrates a block diagram of an example of an information handling system, in accordance with embodiments of the present disclosure.
Figure 2:
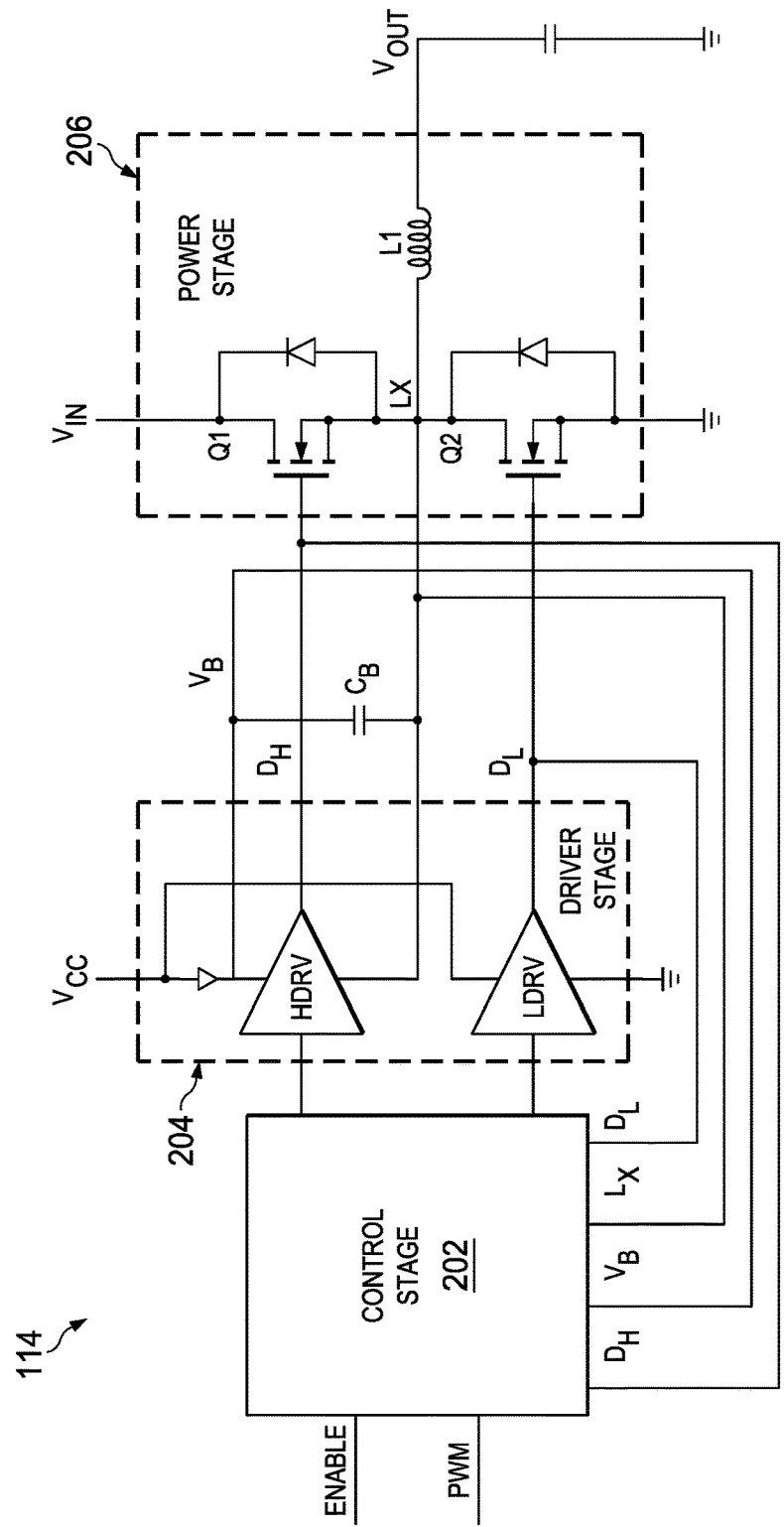
FIG. 2 illustrates a block diagram of an example voltage regulator, in accordance with embodiments of the present disclosure.
Figure 3:
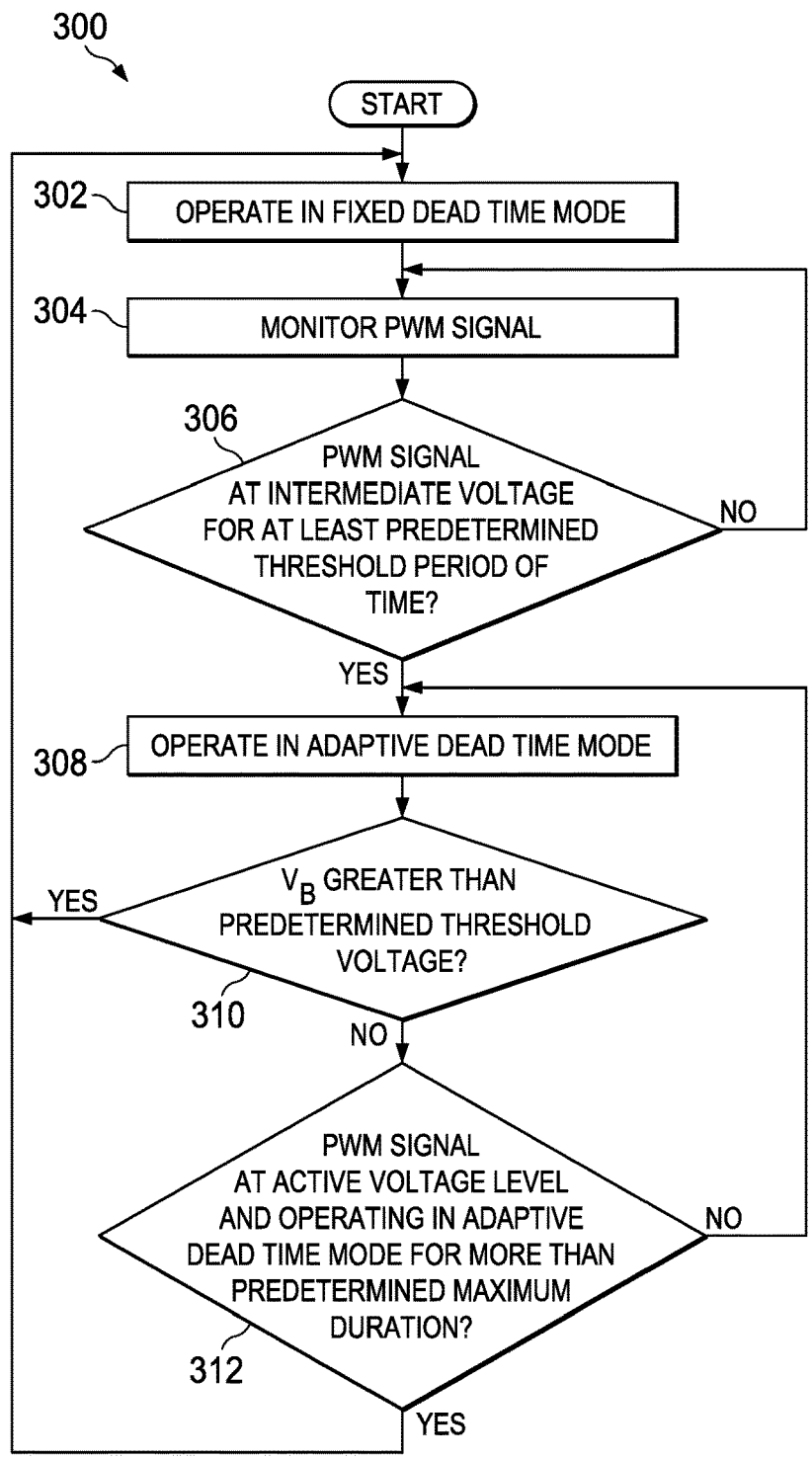
FIG. 3 illustrates a flow chart of an example method for managing a voltage regulator, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 100 incorporating a power system 110 in accordance with an embodiment of the present disclosure. As depicted, information handling system 100 may include a power system 110, and one or more other information handling resources 116.

Generally speaking, power system 110 may include any system, device, or apparatus configured to supply electrical current to one or more information handling resources 116. In some embodiments, power system 110 may include a multi-phase voltage regulator.

Power system 110 may include a power controller 112 and a plurality of voltage regulator phases 114. Power controller 112 may include any system, device, or apparatus configured to control the output of power system 110 and/or selectively enable and disable voltage regulator phases 114. The enabling and disabling of voltage regulator phases 114 is described in greater detail below.

Each voltage regulator phase 114 may include any system, device, or apparatus configured to supply a portion of the total current output of power system 110. In embodiments in which power system 110 is a multi-phase voltage regulator, a voltage regulator phase 114 may comprise a phase of the voltage regulator.

Generally speaking, information handling resources 116 may include any component system, device or apparatus of information handling system 100, including without limitation processors, busses, computer-readable media, input-output devices and/or interfaces, storage resources, network interfaces, motherboards, electro-mechanical devices (e.g., fans), displays, and/or power supplies.

In operation, power controller 112 may selectively enable and disable one or more voltage regulator phases 114 in response to an electrical current requirement of information handling resources, such that one or more phases may be shed to reduce power consumption of power system 110 in response to the reduced current requirement, and thus increase power efficiency of information handling system 100.

FIG. 2 illustrates a block diagram of an example voltage regulator 114, in accordance with embodiments of the present disclosure. In a multi-phase voltage regulation system, voltage regulator 114 depicted in FIG. 2 may represent a single phase of the multi-phase system. Voltage regulator 114 may comprise a control stage 202, a driver stage 204, and a power stage 206. Control stage 202 may comprise any system, device, or apparatus for controlling a high-side driver HDRV and low-side driver LDRV of driver stage 204 based on input and monitoring signals received by control stage 202. Such input signals may comprise an enabling signal ENABLE which indicates whether the phase represented by voltage regulator 114 is enabled or disabled and a pulse-width modulation input signal PWM indicating desired output parameters of a voltage regulator output voltage $V_{OUT}$. Monitoring signals may include a high-side driver output voltage DH, a low-side driver voltage DL, a phase node voltage LX, and a boot capacitor voltage $V_B$. Among the functionality of voltage regulator 114 is to, based on various received input and/or monitoring signals, generate output signals to control dead times of high-side driver HDRV and low-side driver LDRV, including determining whether to apply a fixed dead time or an adaptive dead time based on operational conditions of voltage regulator 114.

Driver stage 204 may include high-side driver HDRV and low-side driver LDRV. High-side driver HDRV may generate an output voltage DH that regulates current through high-side switch Q1 of power stage 206. Similarly, low-side driver LDRV may generate an output voltage DL that regulates current through low-side switch Q2 of power stage 206.

Power stage 206 may comprise a high-side switch Q1, low-side switch Q2, and output inductor L1. High-side switch Q1 may comprise any suitable switching device (e.g., a metal-oxide-semiconductor field-effect transistor or "MOSFET") located between a positive terminal of a power supply $V_{IN}$ and a load, while low-side switch Q2 may comprise any suitable switching device (e.g., a MOSFET) located between the load and a negative terminal of the power supply or ground. The phase node voltage LX may be generated based on the supply voltage $V_{IN}$ and switching of switches Q1 and Q2 and may also indicate a junction point between high-side switch Q1 and low-side switch Q2 and may be fed back into driver stage 204 to provide a reference voltage for high-side switch Q1 (the low-side switch Q2, however, may be referenced to a ground voltage). To that end, a boot capacitor may be coupled between a power supply terminal of high-side driver HDRV and the phase node, and may provide a supply voltage to high-side driver HDRV referenced to the phase node voltage LX. Power stage 206 may also comprise an output inductor L1 between the phase node and the output of the voltage regulator, which may serve to boost or reduce supply voltage $V_{IN}$ to generate output voltage $V_{OUT}$ such that voltage regulator 114 functions as a direct-current to direct-current voltage converter.

In operation, control stage 202 may, based on various received control signals, control high-side driver HDRV and low-side driver LDRV, including imposition of dead times in accordance with either of a fixed dead-time or an adaptive dead-time, as described in greater detail below with respect to FIG. 3.

FIG. 3 illustrates a flow chart of an example method 300 for managing a voltage regulator, in accordance with embodiments of the present disclosure. According to one embodiment, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, control stage 202 may control high-side driver HDRV and low-side driver LDRV in accordance with a fixed dead time. When operating in fixed dead time mode, control stage 202 may, in response to a transition in signal PWM, delay by a fixed amount the propagation of the transition to either of high-side driver HDRV or low-side driver LDRV.

At step 304, control stage 202 may monitor the level of pulse-width modulation signal PWM. Signal PWM may have a full-scale maximum voltage corresponding to logic "1" and a full-scale minimum voltage corresponding to logic "0." In addition, signal PWM may take on intermediate voltage corresponding to neither logic "0" nor logic "1." For example, signal PWM may have the intermediate voltage when the phase corresponding to voltage regulator 114 is disabled (e.g., has been shed).

At step 306, control stage 202 may determine if signal PWM has been at the intermediate voltage for a predetermined threshold period of time. If signal PWM has not been at the intermediate voltage for a predetermined threshold period of time, method 300 may proceed again to step 304. Otherwise, if signal PWM has been at the intermediate voltage for at least the predetermined threshold period of time, method 300 may proceed to step 308.

At step 308, in response to a determination that signal PWM has been at the intermediate voltage for at least the predetermined threshold period of time, control stage 202 may control high-side driver HDRV and low-side driver LDRV in accordance with an adaptive dead time that adapts to account for manufacturing variation of switches Q1 and Q2 that is not easily accounted for with fixed dead time control. Under the adaptive dead time control, control stage 202 may monitor driver output signals DL and DH. When signal PWM transitions high, driver output signal DL may transition low after a propagation delay of control stage 202 and driver stage 204 circuitry. At the same time, control stage 202 may monitor driver output signal DL and cause driver output signal DH to transition high responsive to driver output signal DL falling below a predetermined threshold voltage. On the other hand, when signal PWM transitions low, driver output signal DH may transition low after a propagation delay of control stage 202 and driver stage 204 circuitry. At the same time, control stage 202 may monitor driver output signal DH and cause driver output signal DL to transition high responsive to driver output signal DH falling below a predetermined threshold voltage.

At step 310, control stage 202 may determine whether the voltage $V_B$ across boot capacitor $C_B$ is above a predetermined threshold voltage. When a phase is shed and signal PWM remains at the intermediate voltage for a long period of time, voltage $V_B$ may decay from its maximum value (e.g., supply voltage $V_{CC}$), making the fixed dead time of the fixed dead time mode insufficiently short to prevent shoot-through current. Once voltage $V_B$ is again near supply voltage $V_{CC}$, such problem may no longer be of concern.

Accordingly, in response to determining that voltage $V_B$ across boot capacitor $C_B$ is above the predetermined threshold voltage, method 300 may proceed again to step 302, wherein control logic 202 may re-enter the fixed dead time mode. Otherwise, if voltage $V_B$ remains below the predetermined threshold voltage, method 300 may proceed to step 312.

At step 312, responsive to voltage $V_B$ remaining below the predetermined threshold voltage, control stage 202 may determine if signal PWM is at an active voltage level (e.g., not at the intermediate voltage level) and control stage 202 has been operating in the adaptive dead time mode for more than a predetermined minimum duration (e.g., adaptive dead time has been applied for more than a predetermined number of PWM switching cycles). If signal PWM is at an active voltage level and control stage 202 has been operating in the adaptive dead time mode for more than a predetermined minimum duration (which may ensure voltage $V_B$ is charged to a sufficient level), method 300 may proceed again to step 302, wherein control logic 202 may re-enter the fixed dead time mode. Otherwise, method 300 may proceed again to step 308, and remain in the adaptive dead-time mode.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 100 or any other system operable to implement method 300. In certain embodiments, method 300 may be implemented partially or fully in software and/or firmware embodied in computer-readable media and executable on a processor of information handling system.

By using hybrid fixed dead time and adaptive dead time approach, power conversion efficiency may be maximized due to the shorter dead times that may be implemented in steady-state operation of a voltage regulator, while also permitting adaptive dead time control when transitioning into steady-state operation.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   at least one information handling resource;
   at least one voltage regulator coupled to the at least one information handling resource and comprising:
   a high-side switch and a low-side switch for delivering electrical current to the at least one information handling resource;
   a high-side driver configured to drive a high-side driving voltage for regulating a first electrical current of the high-side switch;
   a low-side driver configured to drive a low-side driving voltage for regulating a second electrical current of the low-side switch; and
   a control circuit configured to operate the at least one voltage regulator in both of a fixed dead time mode and an adaptive dead time mode, wherein:
   in the fixed dead time mode, the control circuit delays by a fixed amount a propagation of a transition of a pulse-width modulated input signal to at least one of the high-side driver and the low-side driver;
   in the adaptive dead time mode, the control circuit transitions one of the high-side driving voltage and the low-side driving voltage in response to a determination that the other of the high-side driving voltage and the low-side driving voltage has decreased below a predetermined threshold voltage; and
   the control circuit operates in the adaptive dead time mode in response to the at least one voltage regulator being disabled for at least a predetermined duration of time.

2. The information handling system of claim 1, wherein the control circuit is further configured to operate in the adaptive dead time mode in response to the pulse-width modulated input signal operating at an intermediate voltage between a logic 1 voltage and a logic 0 voltage for at least a predetermined duration of time.

3. The information handling system of claim 1, wherein the control circuit is further configured to operate in the fixed dead time mode in response to a voltage supply of the high-side driver exceeding a pre-determined threshold voltage.

4. The information handling system of claim 1, wherein the control circuit is further configured to operate in the fixed dead time mode in response to the at least one voltage regulator operating in the adaptive dead time mode for at least a predetermined duration of time.

5. The information handling system of claim 1, wherein the control circuit is further configured to operate in the fixed dead time mode in response to the pulse-width modulated input signal operating at an active voltage corresponding to either of a logic 1 voltage and a logic 0 voltage.

6. A method comprising:
   selecting a mode of operation of a voltage regulator from a fixed dead time mode and an adaptive dead time mode;
   in the fixed dead time mode, delaying by a fixed amount a propagation of a transition of a pulse-width modulated input signal to at least one of a high-side driver and a low-side driver of the voltage regulator, wherein the high-side driver is configured to drive a high-side driving voltage for regulating a first electrical current delivered by a high-side switch to a load and the low-side driver is configured to drive a low-side driving voltage for regulating a second electrical current delivered by a low-side switch to the load;
   operating in the adaptive dead time mode in response to the voltage regulator being disabled for at least a predetermined duration of time; and
   in the adaptive dead time mode, transitioning one of the high-side driving voltage and the low-side driving voltage in response to a determination that the other of the high-side driving voltage and the low-side driving voltage has decreased below a predetermined threshold voltage.

7. The method of claim 6, further comprising operating in the adaptive dead time mode in response to the pulse-width modulated input signal operating at an intermediate voltage between a logic 1 voltage and a logic 0 voltage for at least a predetermined duration of time.

8. The method of claim 6, further comprising operating in the fixed dead time mode in response to a voltage supply of the high-side driver exceeding a pre-determined threshold voltage.

9. The method of claim 6, further comprising operating in the fixed dead time mode in response to operating in the adaptive dead time mode for at least a predetermined duration of time.

10. The method of claim 6, further comprising operating in the fixed dead time mode in response to the pulse-width modulated input signal operating at an active voltage corresponding to either of a logic 1 voltage and a logic 0 voltage.

11. A voltage regulator comprising:
a high-side switch and a low-side switch for delivering electrical current to a load;
a high-side driver configured to drive a high-side driving voltage for regulating a first electrical current of the high-side switch;
a low-side driver configured to drive a low-side driving voltage for regulating a second electrical current of the low-side switch; and
a control circuit configured to operate the voltage regulator in both of a fixed dead time mode and an adaptive dead time mode, wherein:
in the fixed dead time mode, the control circuit delays by a fixed amount a propagation of a transition of a pulse-width modulated input signal to at least one of the high-side driver and the low-side driver;
in the adaptive dead time mode, the control circuit transitions one of the high-side driving voltage and the low-side driving voltage in response to a determination that the other of the high-side driving voltage and the low-side driving voltage has decreased below a predetermined threshold voltage; and
the control circuit is configured to operate in the adaptive dead time mode in response to the voltage regulator being disabled for at least a predetermined duration of time.

12. The voltage regulator of claim 11, wherein the control circuit is further configured to operate in the adaptive dead time mode in response to the pulse-width modulated input signal operating at an intermediate voltage between a logic 1 voltage and a logic 0 voltage for at least a predetermined duration of time.

13. The voltage regulator of claim 11, wherein the control circuit is further configured to operate in the fixed dead time mode in response to a voltage supply of the high-side driver exceeding a pre-determined threshold voltage.

14. The voltage regulator of claim 11, wherein the control circuit is further configured to operate in the fixed dead time mode in response to the voltage regulator operating in the adaptive dead time mode for at least a predetermined duration of time.

15. The voltage regulator of claim 11, wherein the control circuit is further configured to operate in the fixed dead time mode in response to the pulse-width modulated input signal operating at an active voltage corresponding to either of a logic 1 voltage and a logic 0 voltage.

* * * * *